Oct. 8, 1940.  J. R. O'BRIEN  2,217,027
VACUUM BREAKING DEVICE IN WATER SYSTEMS
Filed May 22, 1939
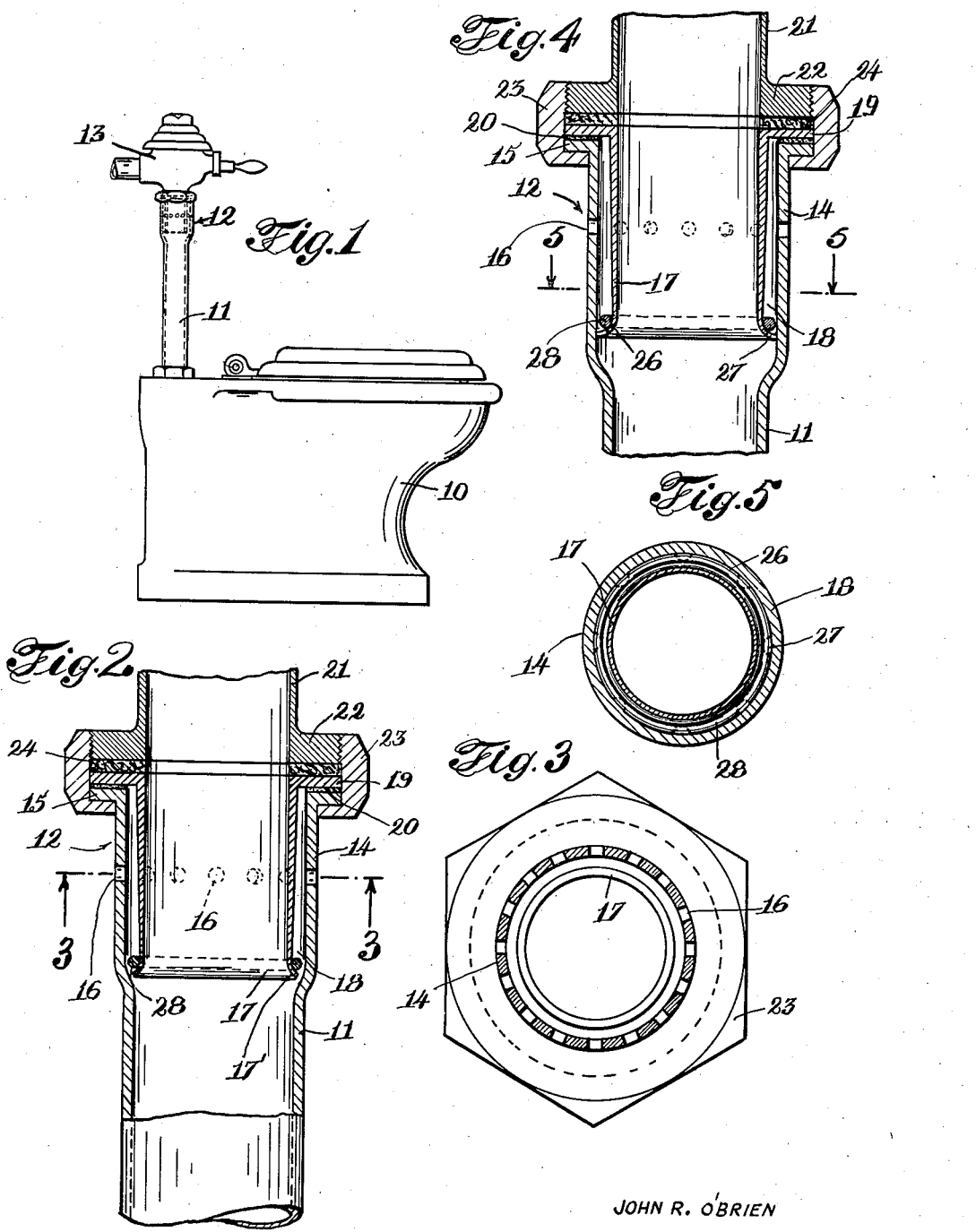
JOHN R. O'BRIEN
INVENTOR
BY *Alexander Mercher*
ATTORNEY Patented Oct. 8, 1940

2,217,027

UNITED STATES PATENT OFFICE 2,217,027

VACUUM BREAKING DEVICE IN WATER SYSTEMS

John R. O'Brien, Jackson Heights, N. Y.

Application May 22, 1939, Serial No. 275,024

3 Claims. (Cl. 137—69)

This invention relates generally to vacuum breaking devices used in connection with water closet bowls or other fixtures where the end of the flush connection is above the water line or submerged in the water thereof. More specifically, the invention relates to a simplified vacuum breaker forming part of the flush connection for water systems to prevent back siphonage.

The main object of the invention is to provide a vacuum breaker which is installed as a flush connection or tail-piece in a water system to prevent back siphonage of the water from the closet bowl or other receptacle, thereby eliminating contamination of the water in the system.

Another object of the invention resides in the provision of a vacuum breaker for normal needs which may be manufactured integral with the tail-piece, which is economical and easy to install in a water system, and which is easy to apply to a system by the expedient of substituting a new flush connection.

A further object of the invention resides in the provision of a vacuum breaker formed in the flush connection and having an emergency check valve to eliminate any possible leakage of water from back spray or excessive back pressure from the bowl.

These objects and other incidental ends and advantages of the invention will hereinafter appear in the progress of the disclosure and as pointed out in the appended claims.

Accompanying this specification is a drawing showing preferred forms of the invention wherein corresponding reference characters designate corresponding parts throughout the several views and wherein:

Figure 1 is a side elevation of a closet bowl and associated mechanism embodying the features of the invention herein.

Figure 2 is a vertical diametrical section of the tail-piece shown in Figure 1.

Figure 3 is a transverse sectional view of Figure 2 along the plane 3—3 thereof.

Figure 4 is a view similar to Figure 3 showing a modified form of a vacuum breaker.

Figure 5 is a sectional view of Figure 4 along the plane 5—5 thereof.

In accordance with the invention and in accordance with the preferred forms shown, a conventional closet bowl 10 is provided with the usual flush connection or tail-piece 11. The upper end of the tail-piece, however, represented generally by numeral 12, provides a housing for a vacuum breaker construction, the latter leading off a conventional flush valve such as a flush valve 13.

The flush or tail piece 11 may be enlarged at the upper end thereof as at 14, the latter terminating at the top in a flange 15.

Intermediate the length of portion 15 is a series of radially disposed openings 16 which communicate with the atmosphere. A shell or baffle 17 is secured to housing 14 so that a chamber 18 is formed between the outer walls of shell 17 and the inner walls of housing 14, the chamber 18 being in communication with flush connection 11. The shell or baffle 17 may be secured to housing 14 by any means such as brazing or welding a flange 19 to flange 15 of housing 14 as indicated by numeral 20. It is also feasible to cast the shell 17 together with the flush connection 11 and housing 14.

The main line 21 leading from the flush valve 13 is joined to the upper end or housing 14 of the flush connection 11 in the conventional manner. However, as shown, the main line 21 terminates at its lower end in an externally threaded shoulder 22. A coupling nut 23 is adapted to secure shoulder 22 to the joined flanges 15 and 19 and a packing ring 24 associated therewith serves to make a fluid tight connection. The coupling nut 23 is internally threaded at the upper portion to engage with shoulder 22, and also engages at the lower portion the undersurface of flange 15 whereby the said nut 23 may be removed by unscrewing downwardly along the flush connection 11.

In Figure 4, shell 17 is provided with a peripheral skirt 26, the said skirt having a series of notches 27 therearound. The skirt 26 is adapted to abut the inner walls of chamber 18, communication between chamber 18 and flush connection 11 being accomplished through the notches 27.

When the flush valve 13 is actuated, water is discharged through the main line 21 passing through shell 17 connected therewith and emptying into bowl 10 from flush connection 11. If a vacuum is present in the system, the tendency for water to be sucked up from bowl 10 into the main line 21 by siphonic action during the actuation of valve 13 is counteracted and eliminated by a breaking of the vacuum. Thus, during the discharge of water through shell 17, air is sucked in from openings 16 by Venturi action and proceeds along chamber 18 into flush connection 11. In the shell 17, shown in Figure 4, the air entering openings 16 proceeds along chamber 18 and enters flush connection 11 through openings 27. The purpose of having openings 27 in skirt 26 is to provide a finer jet of air entering the flush connection 11 thereby forming a water spray which contributes to an increase in the water flow pressure and in the breaking of the vacuum.

It is to be observed that openings 16 are positioned a substantial distance above the lower edge of shell 17. In the event of sub-atmospheric pressure in line 21, the atmospheric pressure entering shell 17 will break such vacuum before water, sucked up from flush connection 11, proceeds along chamber 18 and shell 17 to the position of openings 16. However, there may be unusual circumstances such as back spray or back pressure from bowl 10 sufficient to cause a rise of water in chamber 18 and bring about leakage through opening 16. For this purpose an adaptable emergency valve is provided in chamber 18 which valve may assume the form of a circular member U or V-shaped in cross-section or which valve may assume the form of a solid ring 28. Ring 28 may rest on skirt 26 of shell 17 shown in Figure 4 and may also rest on an outwardly turned flange 17' at the bottom of the shell 17 shown in Figure 2. The outer surface of each of the shells 17 in Figures 2 and 4 is preferably tapered upwardly and outwardly so that when the ring or check valve 28 is in lowermost position as shown in Figures 2 and 4, there is a communicating clearance between the chambers 18 and the flush connection 11. However, if there is back spray or back pressure from bowl 10, ring 28 will be forced upwardly along the outer walls of the shell 17 thereby becoming wedged in chamber 18 below openings 16 to prevent the discharge of water through the said openings.

The vacuum breaker above described, when a check valve 28 is not incorporated therewith, really amounts to an ordinary flush connection or tail-piece cast or formed with an inner shell, the said shell in conjunction with the tail-piece operating as a vacuum breaker. The use of the check valve 28 is not essential but is really a precautionary measure to prevent the remote possibility of leakage through openings 16.

I wish it understood that minor changes and variations in the integration, position, material and construction of parts may all be resorted to without departing from the spirit of the invention and without departing from the scope of the appended claims.

The check valve or ring 28 is preferably made of metal or composition so that when the same is forced upwardly within chamber 18 by extraordinary back spray or back pressure of bowl 10 and wedged into place below openings 16, the release thereof upon the withdrawal of pressure, is brought about by gravity and thereupon is returned to its normal seating position at the flanges 17' or 26.

I claim:

1. In a vacuum breaker for use in water systems including a receptacle and a supply line, a conduit connected at the feeding end of said supply line, an inner spaced shell connected at the upper edge thereof to the conduit to form a tapered chamber therewith, the said shell having an outwardly turned flange at the lower edge and being provided with an opening adjacent thereto for communication between the chamber and the conduit, the said shell forming a discharging connection between the supply line and the conduit, a ring member loosely seated on the said flange within the chamber, the conduit above the lower edge of the shell having a plurality of apertures leading into the said chamber whereby in the presence of sub-atmospheric pressure in the supply line, air is sucked through said apertures and passes down the chamber into the conduit and whereby the ring member in the event of back spray or back pressure from the receptacle is forced upwardly along the outer walls of the shell and wedged within the tapered chamber below the apertures thereby preventing leakage therethrough.

2. In a vacuum breaker for use in water systems including a receptacle and a supply line, a conduit connected at the feeding end to said supply line, an inner spaced shell connected at the upper edge thereof to the conduit to form a tapered chamber therewith, the said shell having a flange at the lower edge abutting the inner walls of the conduit and being provided with a series of openings therearound to form a communication between the chamber and the conduit, a ring member loosely seated on the said flange, the said shell forming a discharging connection between the supply line and the conduit, the conduit above the lower edge of the shell having a plurality of apertures leading into the said chamber whereby in the presence of sub-atmospheric pressure in the supply line, air is sucked through said apertures, passes down the chamber and through the openings in the flange into the conduit and whereby in the event of back spray or back pressure from the receptacle, the ring member is forced upwardly within the tapered chamber to be wedged therein below the apertures in the conduit to prevent leakage therethrough.

3. In a vacuum breaker for use in water systems including a receptacle and a supply line, a conduit connected at the feeding end of said supply line, an inner spaced shell connected at the upper edge thereof to the conduit to form a tapered chamber therewith, the said shell having an outwardly turned flange at the lower edge and being provided with an opening adjacent thereto for communication between the chamber and the conduit, the said shell forming a discharging connection between the supply line and the conduit, a valve means loosely seated on the said flange within the chamber, the conduit above the lower edge of the shell having a plurality of apertures leading into the said chamber whereby in the presence of sub-atmospheric pressure in the supply line, air is sucked through said apertures and passes down the chamber into the conduit and whereby the valve means in the event of back spray or back pressure from the receptacle is forced upwardly along the outer walls of the shell and wedged within the tapered chamber below the apertures thereby preventing leakage therethrough.

JOHN R. O'BRIEN.